Oct. 11, 1966     C. A. SIMMONS     3,277,726
REACTION TIME TESTER FOR ACCELERATION SENSITIVE DEVICES
Filed Dec. 31, 1963     2 Sheets-Sheet 1
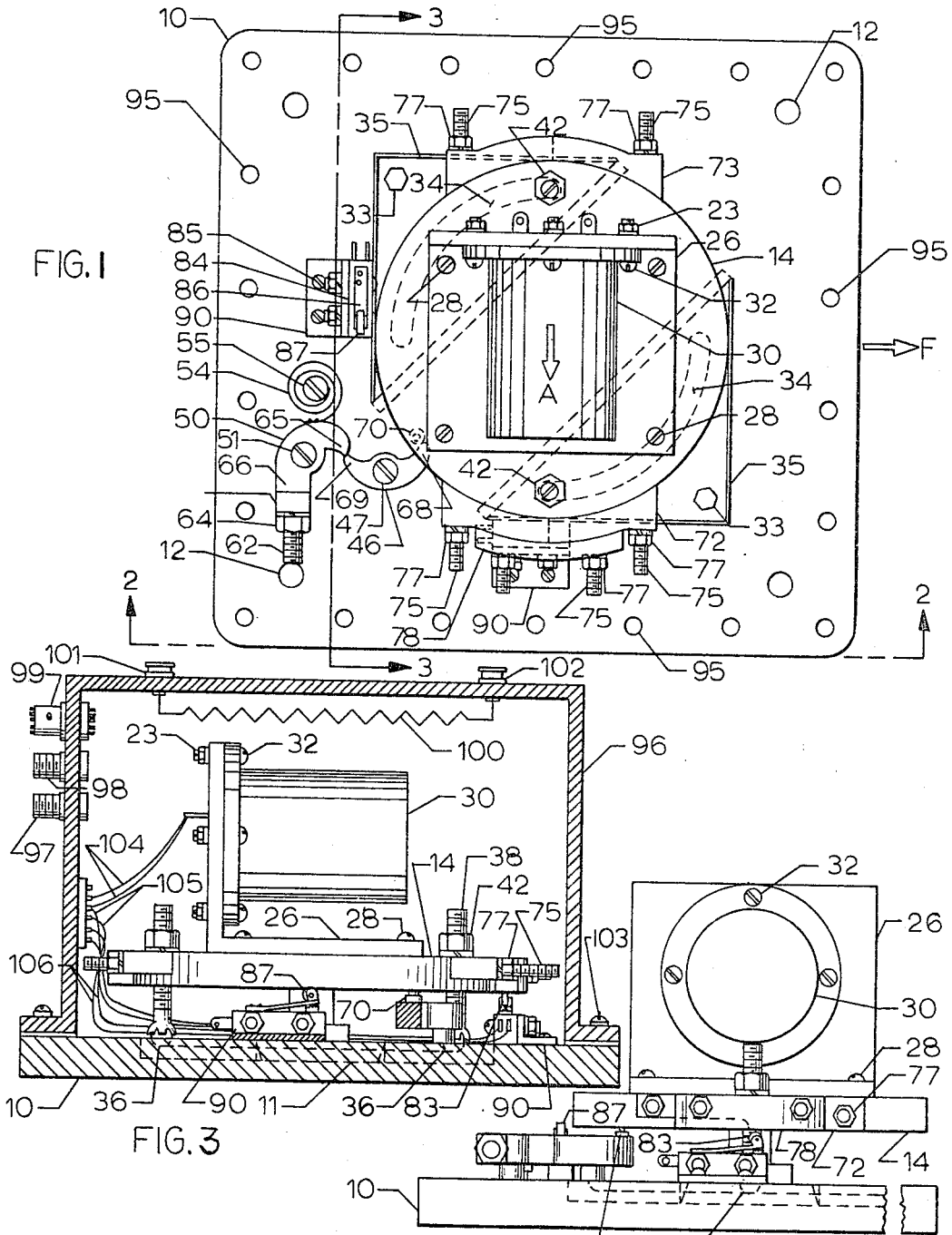
INVENTOR.
CHARLES A. SIMMONS
BY
Michael A. Siles Jr.
ATTORNEY INVENTOR.
CHARLES A. SIMMONS
BY
Michael A. Sileo Jr.
ATTORNEY United States Patent Office 3,277,726
Patented Oct. 11, 1966

3,277,726
REACTION TIME TESTER FOR ACCELERATION SENSITIVE DEVICES
Charles A. Simmons, Winter Park, Fla., assignor to Martin-Marietta Corporation, Middle River, Md., a corporation of Maryland
Filed Dec. 31, 1963, Ser. No. 334,759
13 Claims. (Cl. 73—1)

This invention relates to a laboratory test device used in conjunction with a conventional centrifuge and conventional accelerometers for accurately testing and calibrating diverse type acceleration sensitive apparatus, such as acceleration or "G" switches, and more particularly to a combined variable acceleration simulator and reaction time tester for simulating a predetermined range of acceleration parameters and for simulating variable environmental conditions so as to accurately determine the reaction time of a specific acceleration sensitive apparatus during distinctive dynamic load conditions.

The prior art is replete with laboratory testing devices which utilize centrifugal forces generated by conventional laboratory-type centrifuges. Commonly, devices of this type merely utilize the inherent ability of the associated centrifuge to apply a predetermined linear rate of acceleration or a discrete acceleration force upon the test specimen which is conventionally connected to the centrifuge. Although these prior known devices are capable of determining whether or not the test specimen functions during such linear rate of acceleration or whether or not the test specimen will operate at a given "G" level, none of such prior known testing devices provide the desirable capability of accurately determining the reaction time of the test specimen with regard to a predetermined non-linear rate of acceleration. That is to say, the prior art devices are not capable of accurately determining the time required to completely accomplish one operating cycle or to simulate a predetermined non-linear range of acceleration parameters during one operating cycle within a relatively short interval of time.

In the missile industry, a variety of switching functions are performed during the launch and flight operation of the missile through the use of acceleration sensitive apparatus, such as "G" switches. These apparatus generally experience non-linear rates of acceleration over considerably short intervals of time. It is well known, however, that each missile system has acceleration characteristics under its operating conditions which are considerably different to those acceleration characteristics of other missile systems. It is, therefore, mandatory, that the acceleration sensitive apparatus used in any particular missile system have accurately predictable operating cycles under the precise acceleration environment such apparatus will experience under actual missile launch and flight conditions. Heretofore, it has been necessary to test such acceleration sensitive apparatus under actual launch and flight conditions and thereafter determine by statistical analysis and empirical data, the probability that similiarly designed apparatus will operate in accordance with the actual flight test results.

The prior art has not provided a laboratory test procedure and device which will simulate dynamic environmental and acceleration conditions to ascertain whether or not the specific apparatus to be actually installed into the missile system will accurately function through one operating cycle while being subjected to such conditions. It will be apparent therefore that a device of this type is highly desirable in that "in-flight" failure of acceleration sensitive apparatus may be considerably reduced if the actual apparatus to be used in the missile can be accurately tested before installation therein. Accordingly, such laboratory test devices will desirably reduce the need for utilizing statistical analysis or empirical data to ascertain merely the probability that acceleration sensitive apparatus of similar design will function through one operating cycle, and thereby advantageously enhance the reliability factor of not only the acceleration sensitive apparatus to be used but the entire missile system.

In brief, the device of the present invention advantageously holds the specimen under test in a position in which such specimen is insensitive to the acceleration forces generated by the centrifuge, and maintains this position until a predetermined acceleration force is reached whereupon the specimen is released so that it may be driven in a relatively short interval of time, such as milliseconds, by a mass imbalance technique to a position in which the specimen is sensitive to such predetermined acceleration force. The action of the specimen per unit of time during its movement from its insensitive position to its sensitive position, as well as the conduct of the specimen per unit of time when in its sensitive position, are appropriately monitored and recorded. Comparison of this information with desired parameters permits accurate determination of the operating cycle of the specimen while it was subjected to simulated acceleration conditions within a realistic time interval.

In accordance with the present invention the reaction time tester is mounted on a centrifuge at a predetermined distance from the center thereof with its specimen fixture oriented so that the acceleration force caused by the centrifuge will be perpendicular to the acceleration sensitive axis of the specimen to be tested, which specimen is appropriately mounted on the specimen fixture. A rotatable platform is utilized to support the specimen fixture and is oriented to releasibly support the speciment fixture and accordingly the specimen itself so that the acceleration sensitive axis of the specimen is initially perpendicular to the arm of the centrifuge, so that the specimen will not be subjected to the acceleration forces generated by the centrifuge. A release mechanism is provided for releasing the rotatable platform at a discrete predetermined acceleration or "'G" force induced by the centrifuge. Biasing means associated with the release mechanism are provided for inhibiting release thereof until a predetermined acceleration or "G" force is reached. When the rotatable platform is released, mass imbalance means are provided for causing the table to angularly move due to the acceleration forces induced by the centrifuge to a position wherein the acceleration sensitive axis of the specimen under test is oriented parallel to the acceleration force generated by the centrifuge, this subjecting the sensitive axis of the test specimen to such acceleration forces and consequently causing the specimen to actuate. Switch means are also provided to indicate the commencement and completion of the angular movements of the platform and the associated specimen. In addition, housing means are preferably provided for simulating desirable environmental conditions, such as pressure, temperature, atmosphere, etc., as well as means for connecting instrumentation to the specimen under test.

For purposes of this disclosure the following terms may be defined as follows:

ACCELERATION SWITCH—A switching device which, when subjected to changes of velocity per unit of time, will perform an operational function;

ACCELEROMETER—An instrument for measuring acceleration of a moving body;

"G" FORCE—A unit of measurement used to express the gravitational acceleration acting on an object ($G=32.17$ feet per second per second);

REACTION TIME—Interval of time between the commencement of application of stimuli to an object and the completion of a function by the object due to the stimuli;

DESIGNED REACTION TIME—The reaction time of an object which is inherently determined by the mechanical parameters to which such object is fabricated;

INDUCED REACTION TIME—The reaction time between the application of a stimulus of acceleration force to an object and the final performance of a function for which such object has been designed;

DYNAMIC LOAD—that force which is applied to an object through impartation of motion;

OPERATING LOAD—the forces acting upon an object which is being subjected to dynamic conditions;

CENTRIFUGE—a rotating apparatus which is basically used to simulate acceleration forces and generally used to impart acceleration forces upon objects under test;

RATE OF ACCELERATION—an increase or decrease of the magnitude of acceleration forces on an object per unit of time;

SENSITIVE AXIS—that axis along which an object is responsive to stimuli;

ACCELERATION AXIS—that axis along which an object is sensitive to acceleration forces;

OPERATING CYCLE—the elapsed time between the beginning of action of an object from a state of rest to the end of action of such object to a state of rest; and THRUST - TIME CURVES — characteristic curves which depict the performance of rocket motors in terms of thrust per unit of time.

It is therefore a primary object of the present invention to provide a laboratory test device to be used in conjunction with a centrifuge for accurately testing and calibrating diverse type acceleration sensitive apparatus.

Another object of the present invention is to provide a laboratory test device which utilizes a conventional centrifuge for accurately determining the reaction time of an acceleration sensitive specimen under a predetermined rate of acceleration.

Another object of the present invention is to provide a laboratory test device utilizing a conventional centrifuge for accurately determining the time required for an acceleration sensitive apparatus to completely accomplish one operating cycle which is the time necessary for the specimen to move from a position in which it is insensitive to the acceleration forces generated by the centrifuge to a position in which it is sensitive to such forces, and for advantageously simulating a predetermined non-linear range of acceleration parameters during such operating cycle.

Another object of the present invention is to provide a laboratory test device for testing diverse type acceleration sensitive apparatus which are uniquely capable of simulating a predetermined range of acceleration parameters so as to accurately determine the reaction time of the apparatus being tested during distinctive dynamic load conditions.

Another object of the present invention is to provide a combined variable acceleration and environmental simulator and reaction time tester which is uniquely capable of simulating a variety of acceleration and environmental parameters through a desired operating cycle for accurately determining the reaction time of an acceleration sensitive apparatus under test which heretofore could not be achieved in a simulated laboratory test.

These and further objects and advantages of the present invention will become more apparent upon reference to the following description and claims and the appended drawings wherein:

FIGURE 1 is a top view of a preferred embodiment of the combined variable acceleration simulator and reaction time tester in accordance with the present invention;

FIGURE 2 is an end view of the combined variable acceleration simulator and reaction time tester of the present invention taken along lines 2—2 of FIG. 1;

FIGURE 3 is a side view of the combined variable acceleration simulator and reaction time tester of the present invention taken along lines 3—3 of FIG. 1, with a preferred embodiment of an environmental housing for simulating environmental conditions;

Figure 4:
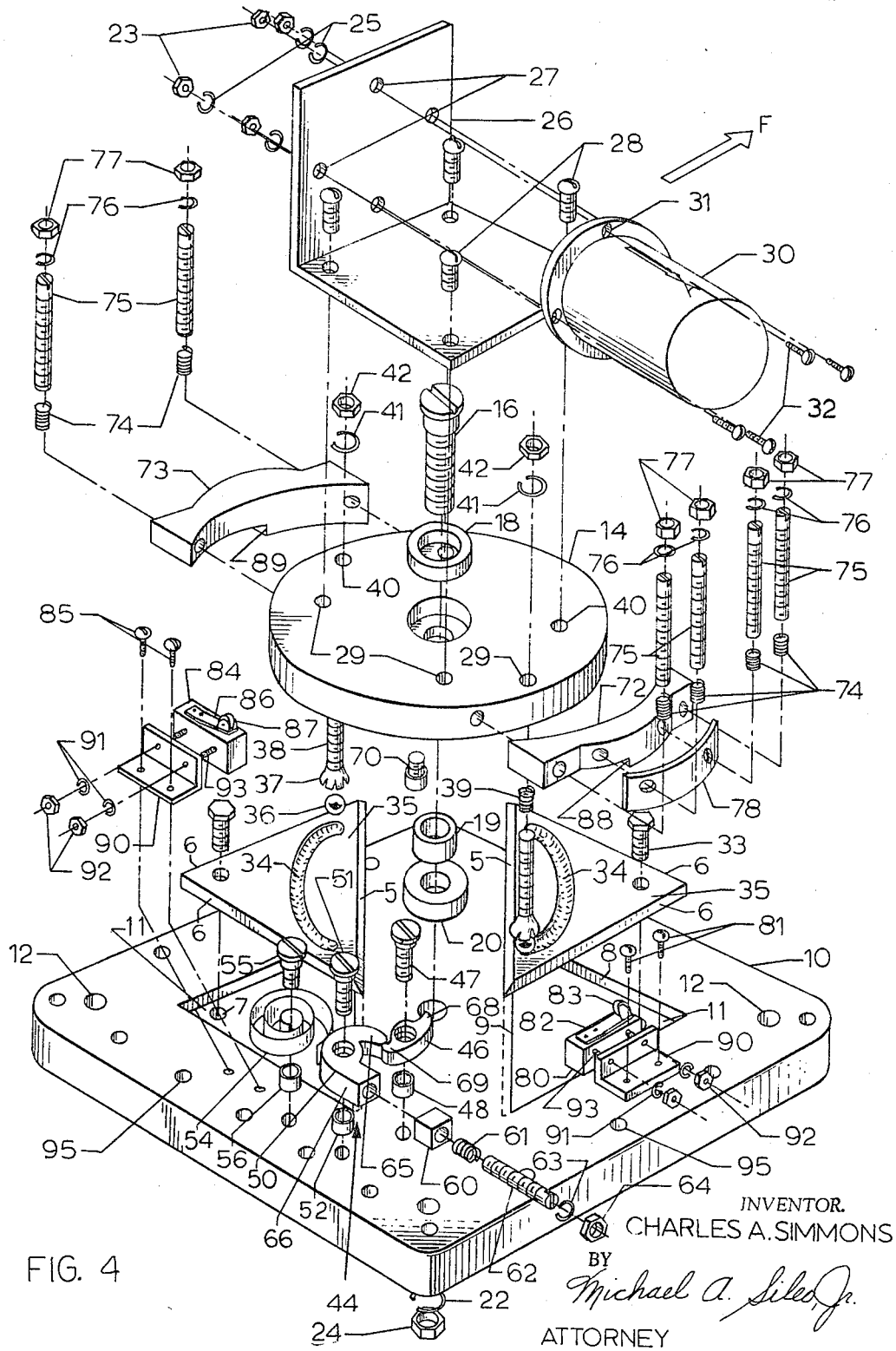
FIGURE 4 is an exploded view of the combined variable acceleration simulator and reaction time tester of FIGS. 1–3 showing detailed components but excluding the environmental housing of FIG. 3.

For purposes of clarity and understanding, corresponding elements in the several figures will be designated with similar reference characters. To further simplify the following description and mode of operation of this invention, it will be assumed that the specimen under test is an acceleration switch having an acceleration sensitive axis A, and that such switch is of kind commonly used in present day missile systems.

*Detailed description—FIGS. 1–4*

Referring to FIGS. 1–4 there are shown a top, end, side and exploded views, respectively, of the combined variable acceleration and environmental simulator and reaction time tester of the present invention. This preferred embodiment of the present invention includes a base support 10 having a plurality of openings 12 for mounting the plate to the arm (not shown) of a conventional laboratory-type centrifuge having an acceleration force F as shown by the arrow in FIGS. 1 and 4, and a rotatable platform 14 which is pivotally connected to the base support 10 via threaded bolt 16, bushings 18–20, lockwasher 22 and nut 24.

A specimen fixture 26 is removably mounted on the platform 14 via a plurality of threaded screws 28. The test specimen 30 is then conventionally mounted on the fixture 26 by threaded bolts 32, nuts 23, and lockwashers 25.

It should be noted that other well known connecting means may be utilized to attach the plate 10 to the arm of the centrifuge; to attach the fixture 26 to the table 14; and to attach the specimen 30 to the fixture 26, without departing from the spirit and scope of the present invention.

Support 10 has one of its faces milled so as to provide two cavities (11), each being preferably right triangular in shape. Each cavity 11 has two adjacent walls 8 perpendicular to the face of support 10, and a third wall 9, which connects the ends of the perpendicular adjacent walls, beveled or slanted away from the center of support 10. The floors of cavities 11 have a threaded tap 7 preferably located near the junction of the perpendicular adjacent walls 8. Triangular shaped inserts 35 are positioned within each cavity 11 and each includes an arcuate groove 34, with these inserts being removble to enable the selection of desired grooves. Inserts 35 are also right triangular in shape but are slightly smaller than cavities 11 with each having two adjacent edges 6 perpendicular to the face of support 10, and a third edge 5, which connects the ends of the perpendicular adjacent edges 6, beveled or slanted away from the center of support 10. Inserts 35 also have a threaded hole 4 preferably located near the junction of the perpendicular adjacent edges 6 so as to be co-axial with the threaded tap 7. When the beveled or slanted edge 5 of inserts 35 are respectively seated adjacent to the beveled or slanted wall 9 of cavity 11, inserts 35 are respectively held within cavities 11, by threaded bolts 33 which are respectively screwed into the threaded holes 4 of inserts 35 and respectively into the threaded taps 7 of cavities 11. Arcuate grooves 34 are primarily provided for accurately guiding the platform 14 when it rotates about its axis. A detailed description of this feature is set forth below with regard to the Mode of Operation of this invention.

In cooperation with grooves 34 of inserts 35 are ball bearings 36 which are rotatably mounted within the petalled ends 37 of threaded bolts 38. Bolts 38 are adjustably secured to platform 14 via openings 40 in cooperation with lock washers 41 and nuts 42. It will be apparent that when the centrifuge reaches a predetermined acceleration force the platform 14 rotates about its axis, and that the bolts 38 in combination with ball bearings 36 and arcuate grooves 34, will hold the platform 14 in a predetermined axial position spaced from support 10 and also prevent unwanted oscillations of the platform 14 as it rotates. Additionally, the nuts 42 may be threadably adjusted on the threaded shank of bolts 38 so as to provide variable pressure between the ball bearings 36 and grooves 34 and consequently vary the friction therebetween. Further, inserts similar to insrts 35 but having grooves with different frictional surfaces may be substitutd so as to provide additional friction varying characteristics between the ball bearings 36 and grooves 34.

A release mechanism, generally indicated at 44, is mounted on support 10 and comprises latch 46, mounted to support 10 via threaded screw 47 and bushing 48; trigger 50, mounted to support 10 via screw 51 and bushing 52; and bias spring 54, mounted to support 10 via threaded screw 55 and bushing 56.

The trigger 50 comprises a hollow weight 60, spring 61, threaded stud 62, lockwasher 63 and nut 64. Trigger 50 is substantially J-shaped having a nose portion 65 and neck portion 66 which is internally threaded. The inside diameter of spring 61 is slightly larger than the outside diameter of stud 62 and the diameter of the hole in weight 60, whereas the diameter of the hole in weight 60 is slightly larger than the outside diameter of stud 62. It will be apparent that when the stud 62 is inserted through spring 61 and weight 60 and threadably engaged to the internally threaded neck 66 of release 50, and when the washer 63 and nut 64 are threadably engaged to the threaded shank of stud 62, one end of the spring 61 will abut the washer 63 while the other end of spring 61 will abut weight 60. Thus, when the spring 61 is compressed between washer 63 and weight 60 a pressure is exerted on the threads of nut 64 and the threads of stud 62 so as to frictionally hold the stud 62 and nut 64 in predetermined positions relative to the threaded neck 66. By appropriate selection of the weight 60 course adjustments in the mass imbalance of release 50 with respect to the acceleration force F may be effected, whereas by appropriate positioning of the stud 62 and nut 64 relative to the trigger 50, vernier adjustments of the mass imbalance of trigger 50 with respect to the acceleration force F may be effected.

Latch 46 is somewhat crescent-shaped having ends 68 and 69. End 69 engages the end 65 of trigger 50 whereas the end 68 engages a stop 70 which is threadably connected to the underside of platform 14. Thus, when the trigger 50 rotates counterclockwise, due t o the acceleration force F, the end 65 of trigger 50 disengages end 69 of latch 46. A detailed description of the forces which enable the release mechanism 44 is set forth in detail hereinbelow with regard to the Mode of Operation of this invention.

Platform 14 also includes balance weights 72 and 73 for course adjustments of the mass unbalancing of the platform 14 with respect to the specimen fixture 26 and specimen 30 under test. The weights 72 and 73 are connected to the platform via springs 74, studs 75, washers 76 and nuts 77. The springs 74, studs 75, washers 76 and nuts 77 provide venier adjustments of the mass of the platform 14, again with respect to the specimen fixture 26 and specimen 30 under test. An arcuate weight 78 is connected to the weight 72 and is held in position by corresponding springs 74, studs 75, washers 76 and nuts 77. It should be noted at this point that the arcuate weight 78 unbalances the mass of platform 14 with respect to the acceleration force F of the centrifuge. Thus, the weights 72 and 73 are utilized to balance the platform 14 with respect to the acceleration force F, whereas arcuate weight 78 is utilized to insert a predetermined unbalance of the platform 14 with respect to the acceleration force F. A detailed description of the forces involved regarding the balancing and unbalancing of platform 14 is set forth in detail hereinbelow with regard to the Mode of Operation of this invention.

A start switch 80 is connected to support 10 via screws 81 and includes an arm 82 having a ball roller 83 at its end. A stop switch 84 is also connected to support 10 via screws 85 and includes an arm 86 having a ball roller 87 at its end. Ball 83 of switch 80 is biased to engage the underside of weight 72. In the position shown, arm 82 is depressed downwardly by the specially shaped step 88 of weight 72, and in this position the switch 80 is normally open. Ball 87 of switch 84 is not depressed downwardly by specially shaped step 89 of weight 73, and in this position switch 84 is normally open. Thus, the open and closed positions of switches 80 and 84 are complementary. It will be noted that when the platform 14 rotates approximately 90° counterclockwise under the influence of acceleration force F the step 89 of weight 73 engages ball 87 of switch 84 and downwardly depresses the arm 86 thereby placing the switch 84 in its closed position.

It will be apparent that the arm 82 of switch 80 in cooperation with step 88 of weight 72 cams the switch 80 into its closed position at the instant the platform 14 begins to rotate due to acceleration force F, whereas the step 89 of weight 73 cams the switch 84 into its closed position only after the platform 14 has rotated a predetermined angular distance, such as 90° as shown in FIG. 4. Thus, by appropriate circuitry (not shown) the closing of switches 80 and 84 may be recorded for data purposes, for example, to measure the discrete time in which the platform 14 took to rotate to a position in which the acceleration axis A of the specimen 30 under test is in parallelism with the acceleration axis F of the centrifuge. Electrical means, such as wires 106 and 108 are provided for coupling signals indicative of the reaction time of the specimen 30 under test.

Referring specifically to FIGURE 3, a housing 96 which is substantially box shaped with a peripheral flange 104, is connected to support 10 via a plurality of threaded bolts 103. Bolts 103 pass through respective openings in the peripheral flange of housing 96 and threadably engage threaded openings 95 of the support 10. Between the flange of housing 96 and the support 10 there is positioned a gasket for sealing purposes so as to prevent any unwanted fluids or gases from seeping into or out of the housing 96. Housing 96 also includes a heater element 100 having its ends electrically connected to terminals 101 and 102. Appropriate voltages may be applied to terminals 101 and 102 for causing heater element 100 to heat the area between housing 96 and support 10. Note here that any well known controllable heating arrangement may be incorporated for the purpose of controlling the temperature within the housing 96, without departing from the spirit and scope of the present invention.

Valve connectors 97 and 98 which are of conventional design, are included on housing 96 for providing means for inserting any desired liquid or gas within the housing 96, or for evacuating the chamber. These connectors enable the present invention to be operated in variable environments, such as high and low pressures, pure or contaminated atmospheres, etc. Additionally, a thermocouple connector 99 also of conventional design is attached to housing 96 so that temperature and pressure readings at desired points on the tester may be made and appropriately recorded.

It is noted here that heating element 100, valve connectors 97 and 98, and thermocouple connector 99 are incorporated in combination with housing 96 so as to provide means for testing the acceleration sensitive apparatus 30 under variable and diverse environments. Clearly, other arrangements of these features may be included without departing from the spirit and scope of the present invention.

FIGURE 3 also shows conductors 106 which are connected to start switch 80; conductors 108 which are connected to stop switch 84; and conductors 109 which are connected to accessory 30. Conductors 106, 108 and 109 are connected to a conventional female plug 107, and a conventional male plug (not shown) may be utilized to couple electrical signals from the start and stop switches 80 and 84 and the accessory 30 to an appropriate signal utilization device (not shown), such as a recorder, printer, oscilloscope, or the like.

*Mode of operation FIGURES 1–4*

Briefly restating, when acceleration sensitive apparatus, such as acceleration switches, are to be quality and performance tested independently of other components of a missile system into which they are to be installed, their functional characteristics under various acceleration parameters cannot be determined adequately through the use of a conventional laboratory centrifuge. Gradual increase of the acceleration force of the centrifuge is clearly not a realistic environment compared to the acceleration-time or thrust-time characteristics of most missile systems into which such acceleration switches will be installed. The present invention in conjunction with a standard centrifuge and standard accelerometers, uniquely provides laboratory simulation of a variety of acceleration vs. time programs and thus, permits accurate testing of the actual acceleration sensitive apparatus to be used in the missile system under realistic operational and environmental conditions.

For example, some acceleration switches presently used in various missile systems are designed to function within a specified time interval, such as 50 milliseconds, after having experienced a specified non-linear range of acceleration forces, such as 0 to 11 G's within a specified time interval, such as 1 to 5 seconds. If such a switch were tested on a standard centrifuge, it would begin to react at some indeterminable time during the gradual linear increase of angular speed, i.e., acceleration, of the centrifuge arm and, if operating properly, the switch would function when an acceleration level in the neighborhood of 11 G's has been attained. The time required for the centrifuge to reach that condition might be of an order of magnitude of 10 to 100 seconds. However, the missile system into which these acceleration switches are to be installed, may exhibit thrust-time curves having a very rapid non-linear acceleration period to 5 G's within the first 500 milliseconds after launch, during which time the switch must not operate, and then having a linear acceleration period during the next one to two seconds to a maximum force level of 16 G's. Through use of the present invention, the foregoing thrust-time characteristics of this particular missile system may be duplicated in the laboratory, and its non-linear excursions of acceleration may be uniquely programmed. Furthermore, combinations of other environments such as temperature, pressure, etc. may be effected simultaneously through use of a special environmental housing which is provided as part of the present invention.

A detailed mode of operation of the exemplary embodiment of the present invention depicted in FIGS. 1–4 is as follows:

The base support 10 is conventionally connected to the arm of a centrifuge (not shown) via threaded bolts (not shown) which extend through openings 12 of support 10 and threadably engage the centrifuge arm. Inserts 35 are then installed into cavities 11 of support 10 via threaded screws 33. These inserts have a predetermined friction programmed groove 34. The rotatable platform 14 is then connected to support 10 via threaded bolt 16, spacers 18, 19 and 20, lockwasher 22 and nut 24. It should be noted that weights 72 and 73 are connected to platform 14 as described earlier whereas weight 78 is not. The specimen to be tested, such as acceleration switch 30, is then connected to fixture 26, which in turn is attached to platform 14 via threaded screws 28. The start switch 80, stop switch 90 and specimen 30 are then appropriately connected to external signal utilization devices (not shown) via conductors 104, 106 and 108, respectively. The laboratory test device of the present invention is now ready for calibration.

There are three primary calibrations to be completed. First, the release mechanism 44 must be calibrated so that it will release the platform 14 at a predetermined "G" level; next, the tester must be balanced so that the platform 14 will not rotate from its position shown in FIGS. 1–4 at the time when the release mechanism 44 is enabled or released; and finally the tester must be mass unbalanced via weight 78 so that it will rotate at least ninety (90) degrees from the position shown in FIGS. 1–4 through a predetermined operating cycle when the centrifuge reaches a predetermined "G" level.

In the three foregoing calibrations two conventional accelerometers (not shown) are utilized for providing acceleration information of both the centrifuge and the rotating platform 14. These accelerometers are respectively connected to the arm of the centrifuge and to the platform 14 or fixture 26.

In calibrating the release mechanism 44, the platform 14 is rotated to the position shown in FIGS. 1–4 and the lug 70 of platform 14 is placed in an abutting position with respect to the leg 68 of the crescent shaped latch 46 so as to prevent the platform 14 from rotating out of this position until a predetermined acceleration force is reached. It should be noted at this point that spring 54 biases the trigger 50 so that its leg 65 prevents the latch 46 from rotating so as to prevent unintentional release of platform 14 before the tester experiences a predetermined centrifugal force, i.e. force "F." An appropriately selected weight 60 is then attached to release mechanism 44 via stud 62 and the stud 62 is randomly threaded into the leg 66 of trigger 50. When the centrifuge rotates through a linear range of acceleration, the first accelerometer (not shown) which is appropriately attached to the arm of the centrifuge, will indicate this range of acceleration and depending upon the mass of weight 60 and the position of stud 62, the trigger 50 will release latch 46 at a certain finite acceleration force thereby permitting platform 14 to rotate counterclockwise under the influence of the acceleration force "F." At this instant the start switch 80 will indicate this counterclockwise movement of platform 14. The time of commencement of rotation of platform 14 is then compared with the first accelerometer reading to determine the acceleration force at which the mass 60 and stud 62 caused the trigger mechanism 44 to release the platform 14. Depending upon the acceleration force at which it is desired to commence rotation of platform 14, appropriate vernier adjustments may be made by rotating stud 62 counterclockwise or clockwise as the case may be. That is to say, the mass imbalance of the trigger mechanism 44 may be further varied by adjusting stud 62 so as to cause the trigger mechanism 44 to release platform 14 at an accurately desired acceleration force. It will be apparent that several adjustments of stud 62 may be necessary in order to "zero-in" upon a predetermined acceleration force for releasing trigger mechanism 44. The reading of the second accelerometer (not shown) which is connected to the fixture 26 is not critical during the calibration of the trigger mechanism 44.

The next calibration requires the balancing of the complete tester with the specimen 30 connected to the fixture 26. The rotation of the centrifuge does not critically affect the accelerometer (not shown) which is connected to the fixture 26 during this calibration so long as this second accelerometer is rigidly connected to fixture 26. The first step in balancing the tester is to connect the weights 72 and 73 to the platform 14 and adjust studs 75 randomly. The centrifuge is again rotated through a linear range of acceleration forces, until the trigger mechanism 44 releases platform 14 which will be at this time at the predetermined acceleration force to which the trigger mechanism 44 has been calibrated. If the mass of platform 14 is in balance with respect to the angular movement of the arm of the centrifuge, the second accelerometer, which is connected to the fixture 26, will continuously read zero since the platform 14 will not rotate out of the position shown in FIGS. 1–4. Accordingly, if the mass of platform 14 is unbalanced with respect to the acceleration force "F," it will rotate through an angle ranging from approximately 1°–90°. An indication that such rotation of platform 14 occurs as a result of a mass imbalance of the platform 14 will be indicated on the second accelerometer which is connected to fixture 26. Thus, any reading of the second accelerometer indicates an unbalance of platform 14 with respect to acceleration force "F." Appropriate adjustments of studs 75 in counterclockwise or clockwise directions as required are then made until the platform 14 is balanced as indicated on the second accelerometer. Again, several attempts may be required and appropriate adjustments of studs 75 before the mass of platform 14 is balanced.

The next calibration is the unbalance of the platform 14 a predetermined amount so that it will rotate at least 90° to a position in which the acceleration axis A of the specimen 30 is in parallelism with the acceleration force F. This is done by attaching weight 78 to weight 72 via studs 75. Again, studs 75 are randomly connected to the weight 72 and the centrifuge rotated through a linear range of acceleration. When the predetermined acceleration force is reached trigger mechanism 44 will appropriately release platform 14 and depending upon the mass imbalance of platform 14 it will rotate through an angle to a position in which the acceleration axis A of the specimen 30 is parallel to acceleration force "F." The start switch 80 will indicate the commencement of rotation of platform 14 whereas the stop switch 84 will indicate the end of rotation of platform 14. During different time intervals, readings of the second accelerometer are taken and plotted in a thrust or acceleration-time curve and compared with a desirable thrust or acceleration-time curve. The studs 75 which hold weight 78 to the platform 14 may be appropriately rotated clockwise or counterclockwise as required so that the platform 14 will rotate at least the predetermined 90°. In addition, a non-linear range of accelerations is possible by adjusting studs 38 which hold the bearings 36 in the programmed groove of inserts 35.

It will be apparent at this point that modifications in the friction surface of groove 34 of insert 35 as well as adjustments of studs 38 permit a programming of the rotation of platform 14 from its position shown in FIGS. 1–4 to a position 90° counterclockwise therefrom. Inserts 35 in combination with studs 38 and ball bearings 36 uniquely provide means for programming the rotation of platform 14 through a non-linear range of accelerations, i.e. zero to the predetermined and desired acceleration force of the centrifuge. Again, readings are taken from the second accelerometer and plotted in a thrust-time curve for comparison with a desired thrust-time curve.

The apparatus of the present invention is now calibrated for testing the specimen 30 through a predetermined non-linear range of accelerations and for determining the exact time in which the specimen 30 functions, i.e. the acceleration switch closes. Accordingly, the centrifuge is rotated through its linear range of accelerations whereupon release mechanism 34 releases the platform 14 at a predetermined acceleration force and the platform rotates through a predetermined program of acceleration forces so that the acceleration axis A of specimen 30 is moved into parallelism with the acceleration force "F" of the centrifuge. The start and stop switches appropriately indicate the start of rotation of platform 14 and the completion of rotation of platform 14, respectively. Whereas, the functioning of specimen 30 is recorded for comparison with ideal function-time tables. In the case shown wherein the specimen 30 is an acceleration switch, the closing time of switch 30 is recorded and compared with predetermined and desirable function-time tables. Thus, it is possible to determine whether or not the specimen 30 will function in accordance with desired requirements. Further, the actual specimen tested may be itself installed into a missile system. It will be noted that a plurality of specimens 30 may be then appropriately connected to fixture 26 and also tested. However, if a specimen is connected to fixture 26 which has characteristics different from that of specimen 30 the foregoing calibrations of the tester must be repeated.

It will be apparent from the foregoing that the variable acceleration and environmental simulator and reaction time tester of the present invention uniquely provides accurate means for testing and calibrating diverse type acceleration sensitive apparatus. The utilization of programmed inserts uniquely provide a laboratory test device capable of simulating a predetermined non-linear range of acceleration parameters within a desired time interval so as to accurately determine the reaction time of the apparatus being tested during difficult dynamic load conditions. Additionally, the utilization of an environmental housing permits the laboratory test device of the present invention to be advantageously capable of providing accurate environmental testing of the apparatus under test. The foregoing features of the present invention heretofore could not be achieved in a simulated laboratory test arrangement.

The terms and expressions which have been employed herein are used as terms of description and not of limitation and it is not intended, in the use of such terms and expressions, to exclude any equivalents of the features shown and described, or portions thereof, but it is recognized that various modifications are possible within the scope of the present invention.

Without further elaboration, the foregoing is considered to explain the character of the present invention so that others may, by applying current knowledge, readily adapt the same for use under varying conditions of service, while still retaining certain features which may properly be said to constitute the essential items of novelty involved, which items are intended to be defined and secured by the appended claims.

I claim:

1. A laboratory apparatus used in conjunction with a centrifuge for determining time required for an acceleration sensitive device to perform a function after being subjected to the influence of acceleration forces comprising, in combination:
    (a) movable support means adapted to be connected to the centrifuge for releasably holding an acceleration sensitive device in a first position in which said device is insensitive to acceleration forces;
    (b) means for causing said support means to move under the influence of said acceleration forces to a second position in which said device is sensitive to acceleration forces;
    (c) release means responsive to the acceleration produced by said centrifuge adapted to prevent movement of said support toward said second position until said acceleration forces reach a predetermined acceleration level; and
    (d) indicating means responsive to the movements of said support means for indicating the time required for said device to perform a function after said device is subjected to the influence of said acceleration forces.

2. A laboratory test apparatus used in conjunction with a centrifuge for determining the time required for an acceleration sensitive device to perform a function after being subjected to the influence of acceleration forces comprising, in combination:
  (a) movable support means adapted to be connected to the centrifuge for holding said device;
  (b) release means for holding said support means in a first position wherein said device is insensitive to acceleration forces, said release means being adapted to release said support means when said acceleration forces reach a predetermined acceleration level;
  (c) mass means for causing said support means to rotate under the influence of said acceleration forces to a second position wherein said device is sensitive to said acceleration forces;
  (d) indicating means responsive to the movements of said support means for developing a signal indicative of the time required for said device to perform a function after said device is subjected to the influence of said acceleration forces; and
  (e) guide means adapted to be coupled between said support means and said centrifuge for controlling said rate of acceleration of said support means from its first to its second position so as to simulate a predetermined operating cycle.

3. A laboratory test apparatus in accordance with claim 2 wherein:
  (a) said support means are adapted to be pivotally connected to said centrifuge so that said support means will rotate from said first position to said second position through a predetermined rate of acceleration whereby said device is subjected to a range of acceleration forces between substantially zero to said predetermined acceleration force level within a predetermined finite interval of time.

4. A laboratory test apparatus in accordance with claim 2 wherein said release means includes:
  (a) latching means for releasably holding said support means in said first position; and
  (b) trigger means adapted to release said latching means when said acceleration forces reach said predetermined acceleration force level and thereby permit said support means to move to said second position.

5. A laboratory test apparatus in accordance with claim 2 wherein said indicating means include:
  (a) first switch means for indicating the commencement of movement of said support means out of said first position; and
  (b) second switch means for indicating the arrival of said support means at said second position.

6. A laboratory test apparatus in accordance with claim 2 and further including:
  (a) housing means connected to said support means for providing a sealed chamber within which said device is positioned;
  (b) said housing means include heater means for controlling the temperature within said chamber, valve means for controlling the atmosphere within said chamber, and electrical connector means for coupling signals developed by said device and indicating means to external signal utilization means.

7. A laboratory test apparatus used in conjunction with a centrifuge for determining the time required for an acceleration sensitive device to perform a function after being subjected to the influence of acceleration forces comprising, in combination:
  (a) support means adapted to be rotatably connected to the centrifuge for supporting said device a predetermined distance from the center of said centrifuge;
  (b) latching means adapted to be connected between said support means and said centrifuge for releasably holding said support means in a first position in which the acceleration sensitive axis of said device is oriented perpendicular to the acceleration forces generated by said centrifuge so that said device is rendered insensitive to said acceleration forces;
  (c) trigger means responsive to the acceleration produced by said centrifuge adapted to be connected between said latching means and said centrifuge for releasing said latching means when said acceleration forces reach a predetermined acceleration level;
  (d) imbalance mass means connected to said support means for causing said support means to rotate under the influence of said acceleration forces to a second position in which the acceleration sensitive axis of said device is oriented parallel to the acceleration forces generated by said centrifuge so that said device is rendered sensitive to said acceleration forces; and
  (e) switch means responsive to the rotation of said support means for developing a signal indicative of the reaction time required for said device to perform a function after being subjected to the influence of said acceleration forces.

8. A laboratory test apparatus in accordance with claim 7 and further including:
  (a) guide means frictionally coupled to said support means for controlling the rate of acceleration of said support means from its first position to its second position so as to simulate a predetermined operating cycle.

9. A laboratory test apparatus in accordance with claim 8 wherein said guide means includes:
  (a) at least one arcuate groove formed in said support means, and at least one elongated spacer having a ball bearing rotatably connected at one end, said ball bearing being frictionally seated within said groove so as to guide said support means when it rotates.

10. A laboratory test apparatus in accordance with claim 7 wherein said trigger means includes:
  (a) second mass means adapted to cause said trigger to release said latching means when said acceleration forces reach said predetermined acceleration level.

11. A reaction time tester used in combination with a centrifuge for determining the time required for an acceleration sensitive device to perform a function after a distinctive non-linear operating cycle comprising, in combination:
  (a) a stationary support adapted to be rigidly connected to the arm of said centrifuge;
  (b) a platform rotatably connected to said support;
  (c) a fixture rigidly connected to said platform and adapted to rigidly support said device;
  (d) a release mechanism pivotally connected to said support and including a latch for releasably engaging said platform and holding said platform in a first position wherein the acceleration axis of said device is oriented perpendicular to the acceleration force generated by said centrifuge so as to render said device insensitive to said acceleration forces;
  (e) said release mechanism further including a trigger which is adapted to disengage said latch from said platform when said acceleration forces reach a predetermined acceleration level;
  (f) imbalance mass means connected to said platform for causing said platform to rotate to a second position after said trigger disengages said latch wherein the acceleration sensitive axis of said device is oriented parallel to the acceleration force generated by said centrifuge so as to render said device sensitive to said acceleration forces;
  (g) first switch means connected to said support for generating a first signal indicative of the time said platform commenced movement out of said first position, and second switch means connected to said support for generating a second signal indicative of the time of arrival of said platform at said second position; wherein the time interval between said first and second signals represents the reaction time of said device;

(h) guide means formed in said support and frictionally coupled to said platform for controlling the rate of acceleration of said platform from its first position to its second position so as to cause said device to rotate through a predetermined non-linear operating cycle; and (i) electrical means connected to said device for indicating the performance of said function.

12. A reaction time tester in accordance with claim 11 wherein said platform further includes:
(a) first and second cam means respectively associated with said first and second switch means;
(b) said first cam means being adapted to cam said first switch into its open position when said platform is in its first position and to cam said first switch into its closed position when said platform initially commences movement toward its second position; and
(c) said second cam means being adapted to cam said second switch out of its normally open position into its closed position when said platform arrives at said second position.

13. A reaction time tester in accordance with claim 11 wherein said guide means includes:
(a) at least one arcuate groove formed in said support, and at least one elongated spacer housing a ball bearing rotatably connected at one end and the other end connected to said platform, said ball bearing being frictionally seated within said groove so as to guide said platform when it rotates.

References Cited by the Examiner
UNITED STATES PATENTS 3,180,131  4/1965  Thompson _____ 73—1

OTHER REFERENCES

Rucker Centrifuge Acceleration Test Machines, Technical Bulletin S-10-20, a publication of the Rucker Company, 4700 San Pablo Ave., Oakland, Calif. (Page 7 relied upon.)

LOUIS R. PRINCE, *Primary Examiner.*

S. C. SWISHER, *Assistant Examiner.*